(12) United States Patent
Fleytman

(10) Patent No.: US 6,916,140 B2
(45) Date of Patent: Jul. 12, 2005

(54) METHOD OF PRODUCING AN ENVELOPING WORM

(76) Inventor: Yakov Fleytman, 3233 Hickory Dr., Lake Orion, MI (US) 48359

( * ) Notice: Subject to any disclaimer, the term of this patent is extended or adjusted under 35 U.S.C. 154(b) by 107 days.

(21) Appl. No.: 10/669,972

(22) Filed: Sep. 24, 2003

(65) Prior Publication Data

US 2005/0063794 A1 Mar. 24, 2005

(51) Int. Cl.[7] .......................... B23F 13/06; B23F 13/00; B23F 11/00
(52) U.S. Cl. .......................................... 409/48; 74/458
(58) Field of Search .............................. 409/48, 25–26, 409/38–41, 50–51, 53–55; 74/458

(56) References Cited

U.S. PATENT DOCUMENTS

| 1,885,686 | A | | 11/1932 | Cone | |
|---|---|---|---|---|---|
| 1,965,002 | A | * | 7/1934 | Richer | 409/48 |
| 1,987,877 | A | | 1/1935 | Trbojevich | |
| 2,006,750 | A | * | 7/1935 | Shlesinger | 409/26 |
| 3,099,939 | A | * | 8/1963 | Haase et al. | 409/25 |
| 3,608,394 | A | * | 9/1971 | Ishikawa | 74/458 |
| 5,018,403 | A | * | 5/1991 | Umezono et al. | 409/48 |
| 5,175,962 | A | * | 1/1993 | Pedersen | 409/26 |
| 5,497,671 | A | * | 3/1996 | Rourke | 74/416 |
| 5,961,260 | A | * | 10/1999 | Kasler et al. | 409/25 |
| 6,148,683 | A | | 11/2000 | Fleytman | |
| 6,402,652 | B1 | | 6/2002 | Fleytman et al. | |
| 6,447,418 | B1 | | 9/2002 | Fleytman | |
| RE38,504 | E | * | 4/2004 | Kasler et al. | 409/25 |
| 2004/0221672 | A1 | * | 11/2004 | Fleytman | 74/425 |

FOREIGN PATENT DOCUMENTS

| GB | 2276575 A | * | 10/1994 |
|---|---|---|---|
| JP | 1-140916 A | * | 6/1989 |

* cited by examiner

Primary Examiner—Erica Cadugan

(57) ABSTRACT

Enveloping worm threads with less than one revolution have on one side concave surface and on another side convex surface. This makes generation of concave and convex enveloping worm surfaces simultaneously and makes modification of surfaces by individual machining of each surface. Proposed method uses cutting edges that have rotation radius according with radius of curvature of machining surface. Another variation simultaneously cuts several threads, where enveloping worm blank has rotation around its own axis of rotation and relative motion to helical cutter around tooling axis. This reduces production cost and makes manufacturing easily.

11 Claims, 17 Drawing Sheets

METHOD OF PRODUCING AN ENVELOPING WORM

FIELD OF THE INVENTION

The present invention relates to production of an enveloping worm. The enveloping worm is a pinion in two general worm gear units: double enveloping or globoid gears and enveloping worm face gears. They are used to reduce or to increase speed or increase or reduce torque in helicopter or automobile gearboxes, turbine gearboxes, ship's transmission, and industrial applications. Certain applications may be outside of these fields, like power windows, doors or seats, power steering systems, chainless bicycle or motorcycle transmissions, and much more.

BACKGROUND OF THE INVENTION

A right angle gear transmission is well known for the transformation of motion and power between shafts where the axes of the pinion and the gear may be crossed or intersected. Recently two new types of enveloping worm gear transmissions from my U.S. Pat. No. 6,148,683 and enveloping face transmission from my patent application Ser. No. 10/435,143 made right angle gear transmission more attractive for use in many applications, even in applications where it was traditional to use parallel shaft gears. The more expensive cost of production of enveloping worms limits its use only when it is necessary to transfer mechanical power between crossed or intersected shafts. New technology lowers production cost of spiral bevel and hypoid gears, but to make enveloping gears and especially enveloping worm, more machining time is still required. In the Cone patent (U.S. Pat. No. 1,885,868) and Trbojevich patent (U.S. Pat. No. 1,987,877) generation of a worm wheel makes by relative rotation of a hob and a wheel blank in predetermined time relation on axes perpendicular to each other. During hobbing the distance between axes of the hob and the wheel blank change. It is a low speed production technology.

SUMMARY OF THE INVENTION

Right angle gears have very wide use in many applications. Right angle gears for the same size of the pinion and the same ratio have more than 50 percent torque capacity of traditional parallel shaft gearings. This is primarily due to high contact ratio. In current production technology enveloping worm hobbing is using radial feeding. Tangential feeding was used only for manufacturing gears, where axis of rotation of a hob and axis of rotation of gear that was being cut were parallel. Also in known tangential feeding a cutting tool and a blank that is being cut have relative rotation motion around axis of rotation gear blank. In present invention cutting tool and enveloping worm blank have relative rotation motion around axis of rotation of cutting tool. Present invention uses tangential feeding for manufacturing enveloping worm where axis of rotation of cutting tool (tooling axis) and enveloping worm blank are crossing.

Further areas of applicability of the present invention will become apparent from the detailed description provided hereinafter. It should be understood however that the complete description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the comprehensive description and the accompanying drawings, wherein.

DETAILED DESCRIPTION OF THE PREFERRED EMBODIMENTS

The following discussion relating to FIGS. 1–21 provides a detailed description of the unique method for manufacturing enveloping worm that can be utilized with the present invention.

Figure 1:
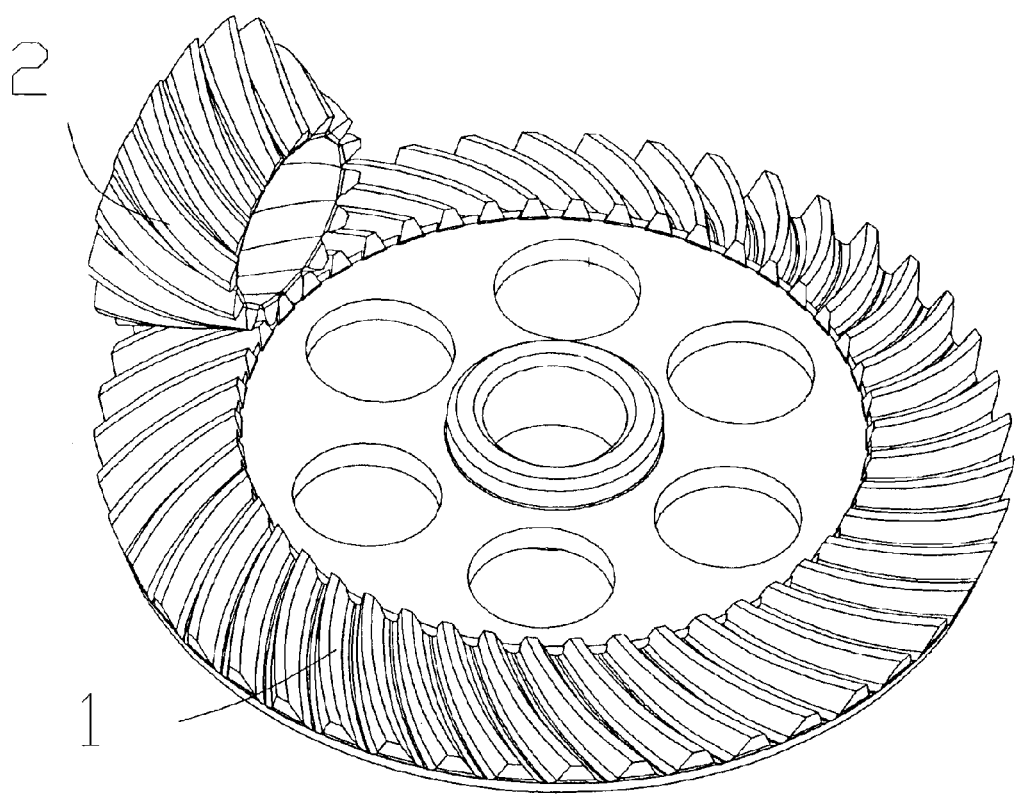
FIG. 1 is an isometric view of an enveloping face gears with enveloping worm having threads with less than one revolution.

FIG. 1 is an isometric view of face gear 1 of an enveloping worm face gear transmission in mesh with enveloping worm 2. The enveloping worm face transmission is a new type of right angle gears (U.S. patent application Ser. No. 10/435, 143). Said enveloping worm 2 having at least one thread that is engaged by at least one tooth of said worm gear 1 wherein said worm gear 1 is a face gear and said enveloping worm 2 is placed into face arrangement with said worm gear 1. In this enveloping worm face transmission the enveloping worm 2 could have any design, however, it is preferred that the enveloping worm is utilized for standard enveloping or double enveloping worm/worm gear transmission. The difference is that we are using threads with less than one revolution.

Figure 2:
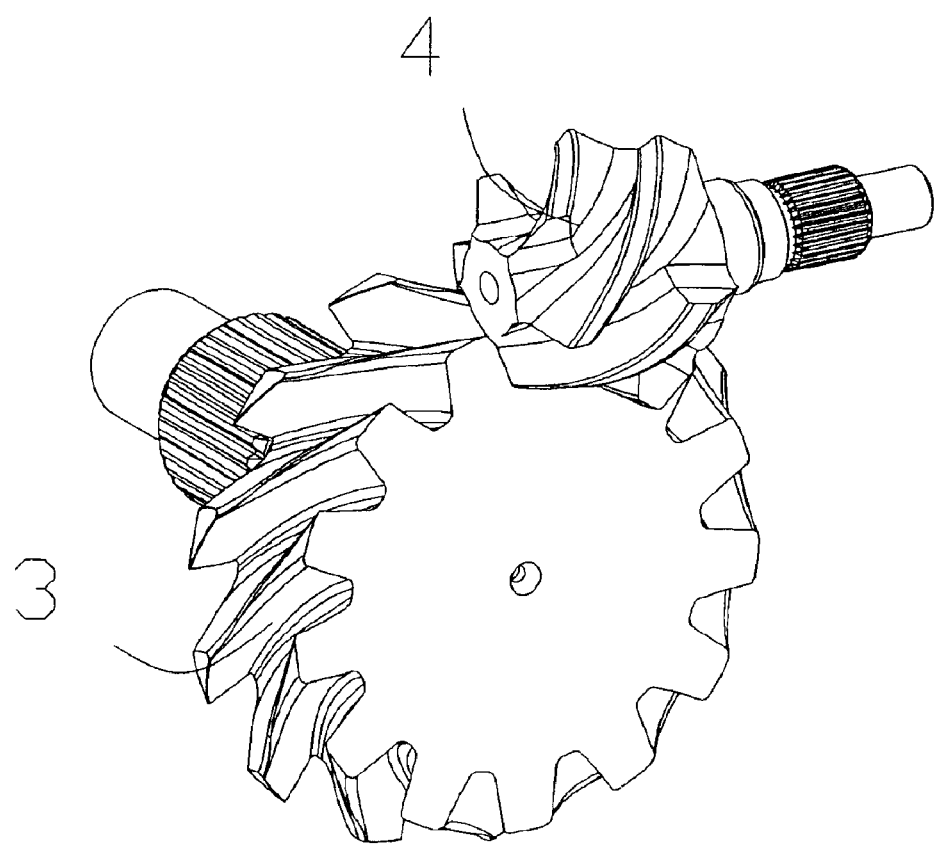
FIG. 2 is an isometric view of enveloping gears with enveloping worm having threads with less than one revolution.
Figure 3:
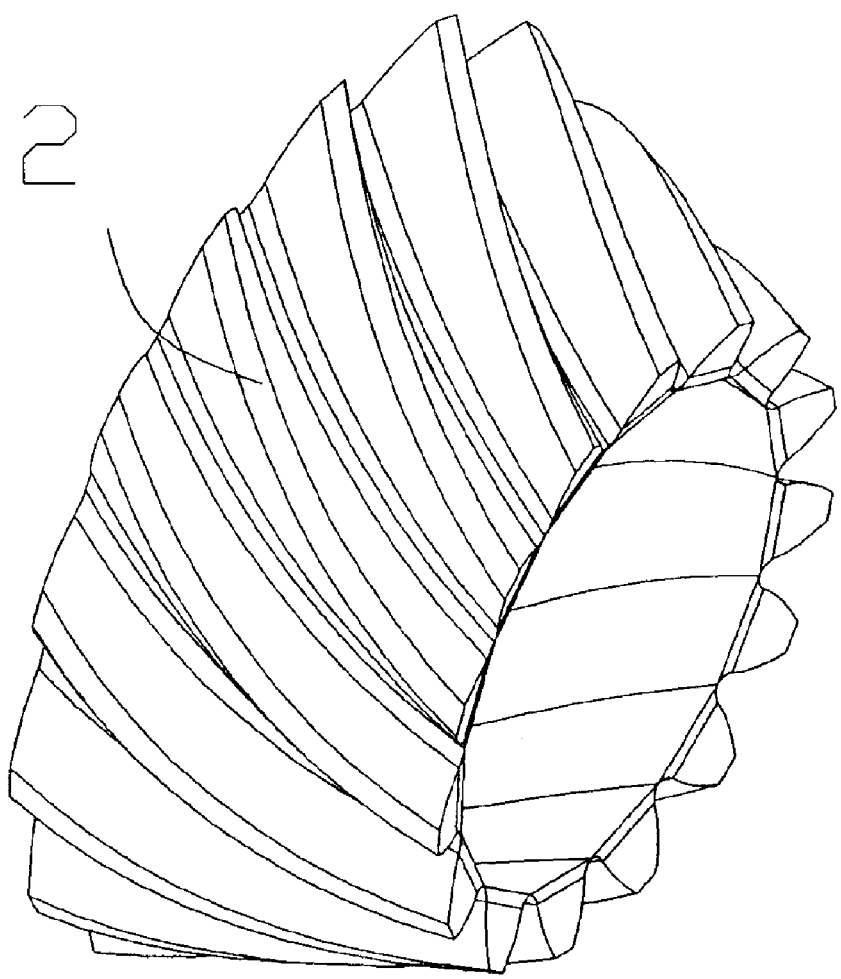
FIG. 3 is an isometric view of an enveloping worm, having threads with less than one revolution.

FIG. 2 is an isometric view worm gear 3 in mesh with enveloping worm 4. This enveloping worm transmission is a new type of right angle gears (U.S. Pat. No. 6,148,683). This is the same enveloping worm that is used in standard enveloping or double enveloping worm/worm gear transmissions. The difference is that we are using threads with less than one revolution or even less than 180 degree of revolution. Enveloping worms 2 and 4 have the same principal of design. FIG. 3 is an isometric view of an enveloping worm 2, having threads with less than one revolution. We will use this enveloping worm for illustration of the inventing method for manufacturing an enveloping worm.

Figure 4:
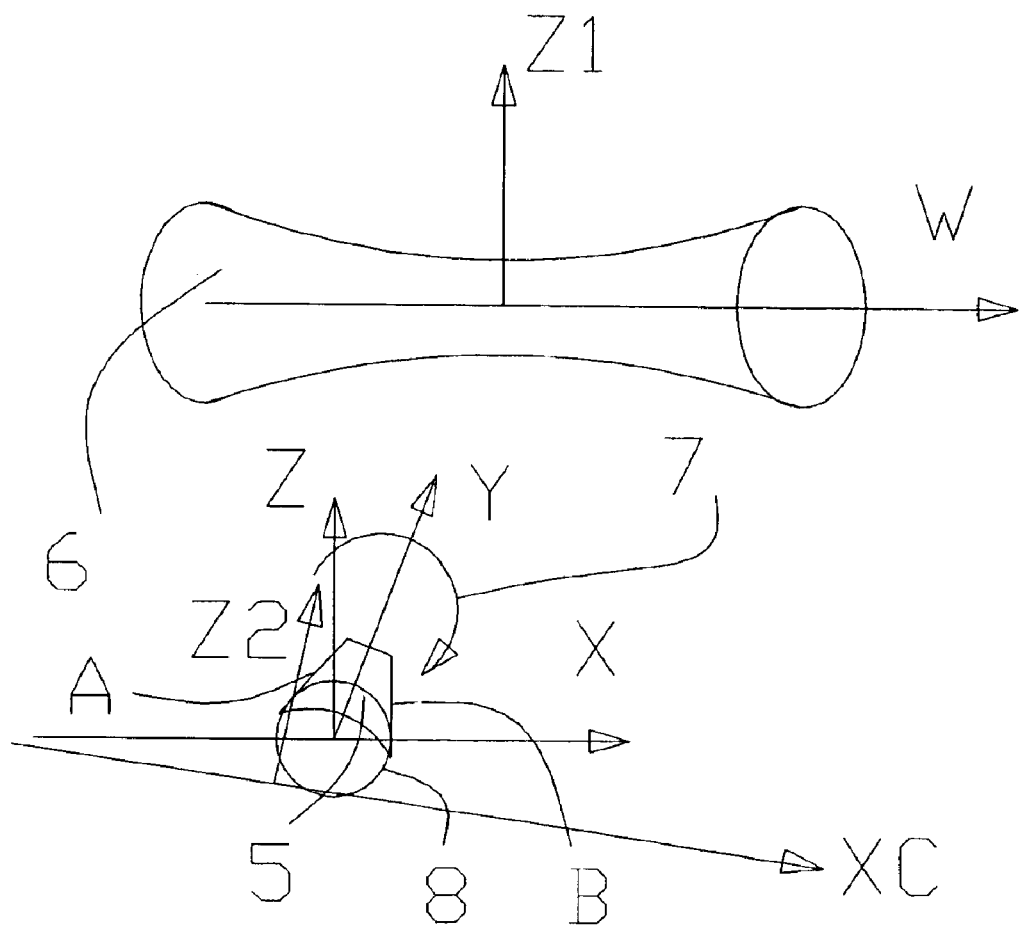
FIG. 4 shows a machine setting for manufacturing enveloping worm.
Figure 5:
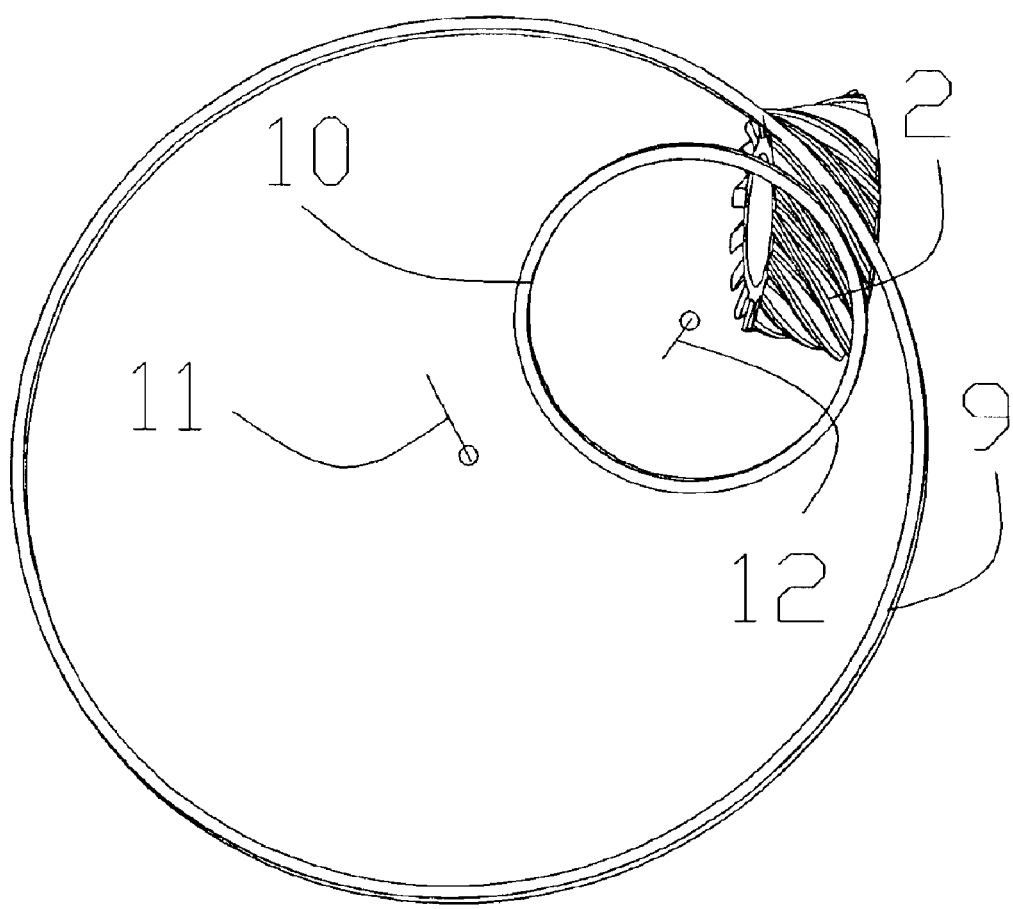
FIG. 5 is an isometric view of enveloping worm in mesh with two rotating cutters for machining concave and convex surfaces of the enveloping worm threads.
Figure 6:
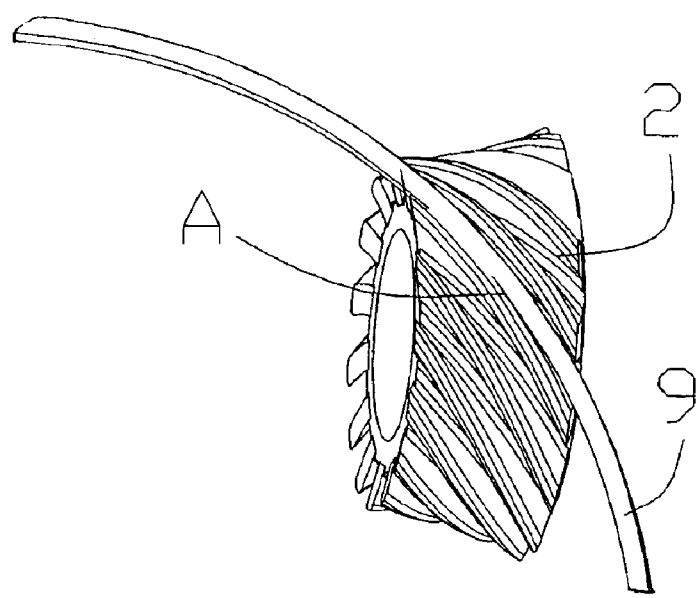
FIG. 6 is an isometric view of enveloping worm in mesh with rotating cutter for machining concave surface of the enveloping worm threads.
Figure 7:
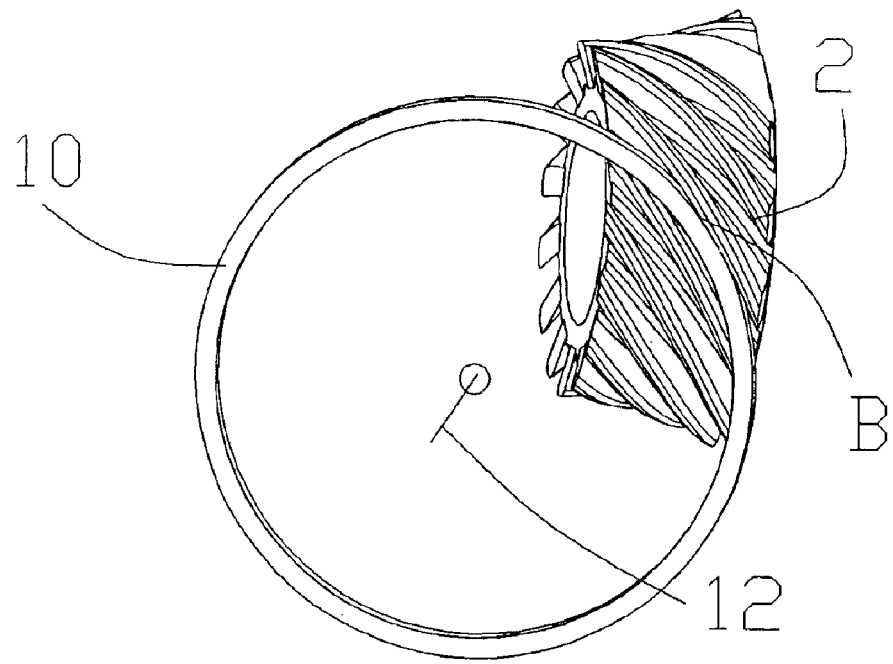
FIG. 7 is an isometric view of enveloping worm in mesh with rotating cutter for machining convex surface of the enveloping worm threads.

FIG. 4 shows an example of machine setting for manufacturing an enveloping worm. X, Y, Z is base coordinate system, placed in the middle of the base circle 8 that is usually used for design of standard enveloping worms. W is axis of rotation of worm's blank 6. Vector Z1 normal to cutting plane YX is made from intersection of axis Y with axis W. Arrow 7 is the direction of turning to reposition cutter 5. Cutting tool 5 has edge A for cutting convex and edge B for cutting concave surfaces of worm blank 6. Base circle 8 belongs to cutting plane X and Y. This set-up can be used to machine concave or convex surfaces of enveloping worm thread. For machining the thread of enveloping worm by using Gleason or Oerlicon machines the cutting tool is a ring with cutting edges located on a circle around a tooling axis of rotation. This is the same tool that is used for production of spiral bevel or hypoid gears. Enveloping worm 2 is in mesh with rotating cutter 9 having cutting edges A for machining convex surface and cutter 10 with cutting edges B for machining concave surface of the enveloping worm threads shown in FIG. 5. Tooling axis of rotation for cutter 9 is 11 and tooling axis of rotation for cutter 10 is 12. Method of producing an enveloping worm requires defining trajectory of motion for a cutting tool in order to generate concave and convex surfaces of the enveloping worm thread. To generate convex surface of an enveloping worm thread, cutter 9 rolls around a base circle 8 on a cutting plane with simultaneous rotation of an enveloping worm blank around axis W. Cutting edge A of said cutter furthermore rotates around a tooling axis. Said tooling axis 11 may be laying on cutting plane or be offset to cutting plane or intersect the cutting plane. The same applies to generation of concave surface of the enveloping worm thread. It includes generation of an enveloping worm thread surface as cutter 10 rolls around base circle 8 on a cutting plane with simultaneous rotation of an enveloping worm blank around axis W, where a cutting edge B of said cutter furthermore rotates around a tooling axis. Said tooling axis 12 may be laying on cutting plane or be offset to cutting plane or intersect the cutting plane. For more flexible cutting said tooling axis 11 or 12 has additional motion, in direction normal to cutting plane or has addition motion by changing an angle between said tooling axis of rotation and cutting plane. For precise cutting the radius of rotation of cutting edge A (distance from edge A to tooling axis 11) is equal to or bigger than the maximum radius of convex curvature of said worm thread and the radius of rotation of said cutting edge B (distance from edge B to tooling axis 12) is equal to or smaller than the maximum radius of concave curvature of said worm thread.

Machining of modified convex thread of the enveloping worm can be done by placing said cutter in a new position defined by reposition of cutting plane from original position to said position. It will be done by turning cutting tool 5 around Y axis and then transferring along Y axis. New cutting plane for machining convex surface is defined by XC and Y axes and new position of vector Z1 is defined by Z2. Modified surfaces of enveloping worm thread could be designed and then manufactured using derived equations of the repositioned surfaces or by computer modeling or special setup of a machine according with the principles of present invention, where said reposition of cutter 9 (or 10) from original position into said new position is defined by turning cutter 9 (10) relative to said base coordinate system and said enveloping worm axis of rotation. Another way of modifying profile of enveloping worm thread surfaces is by repositioning cutter 9 (or 10) from original position into said new position that is defined by transferring cutter 9 (or 10) relative to said base coordinate system and enveloping worm axis of rotation. It can also be done by combinations of transferring and turning said cutter relative to said base coordinate system and said enveloping worm axis of rotation. Placement of cutter 9 in said new position is for machining convex surface of enveloping worm thread 2 and placement of cutter 10 in said new position is for machining said concave surface of enveloping worm thread 2. Above describe method where we are using a tool with rotating cutting edges could as well be applied to manufacturing gears 1 and 3.

Figure 8:
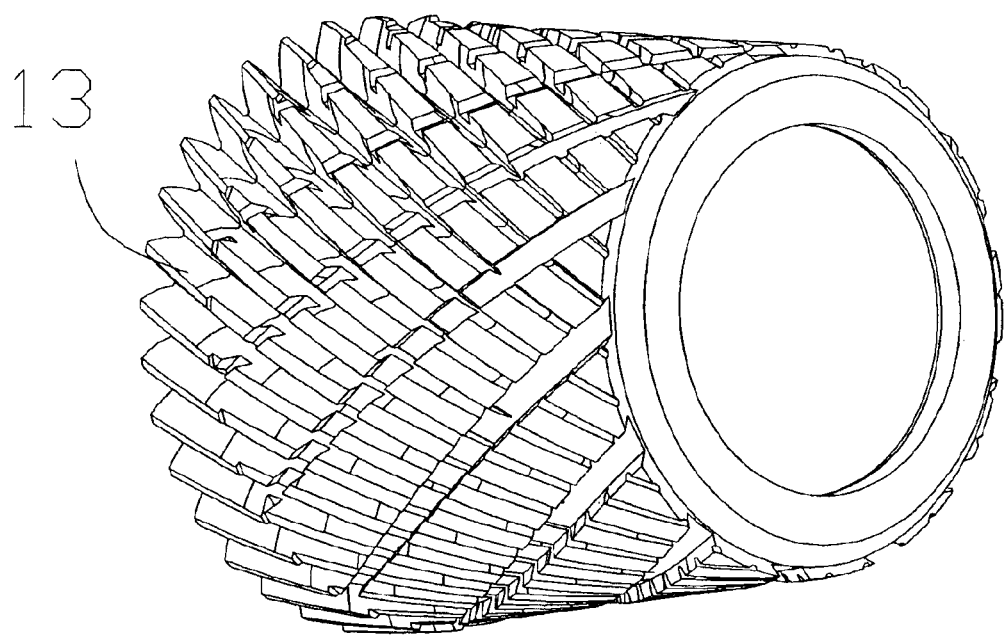
FIG. 8 is an isometric view of a helical hob for machining an enveloping worm thread.

FIG. 8 is an isometric view of cutter 13 for machining a blank of enveloping worm. Cutter 13 is a hob having shape of helical gear. Shape for hob can be the shape of a hob that is widely used for tangential cutting of worm gears, not enveloping worm (pinion).

Cutter's 13 linear feed motion could be calculated according with helical angle of the hob, lead angle of enveloping worm thread and desired cutting speed. Rotation speed of cutter 13 in ratio times is slower than the rotational speed of the blank of enveloping worm.

Figure 9:
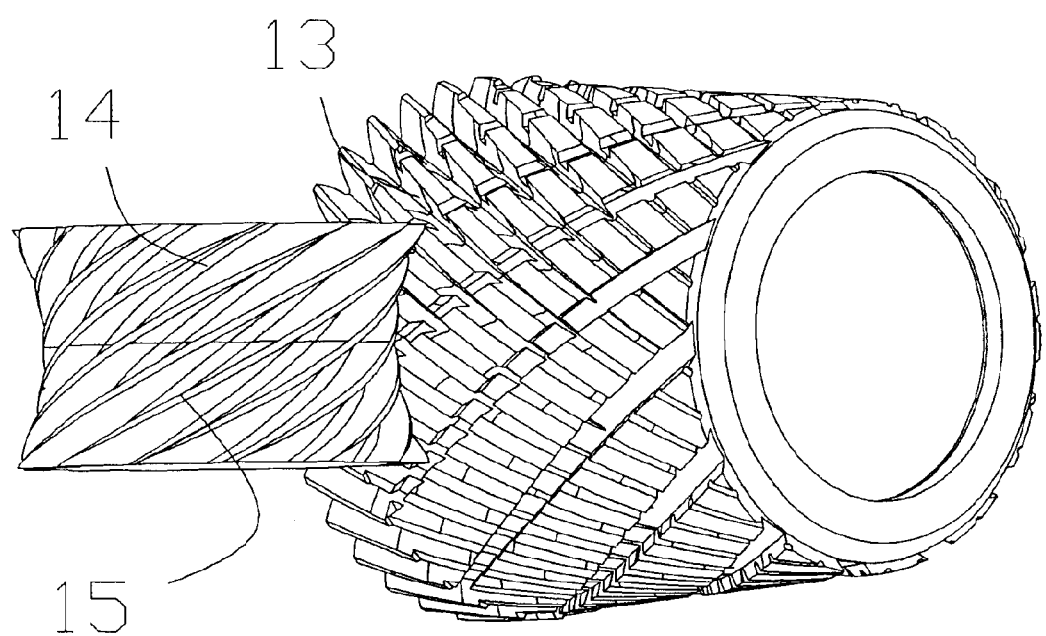
FIG. 9 is an isometric view of a helical hob in mesh with manufacturing enveloping worm having threads with less than one revolution. Enveloping worm has a split line in the middle.
Figure 10:
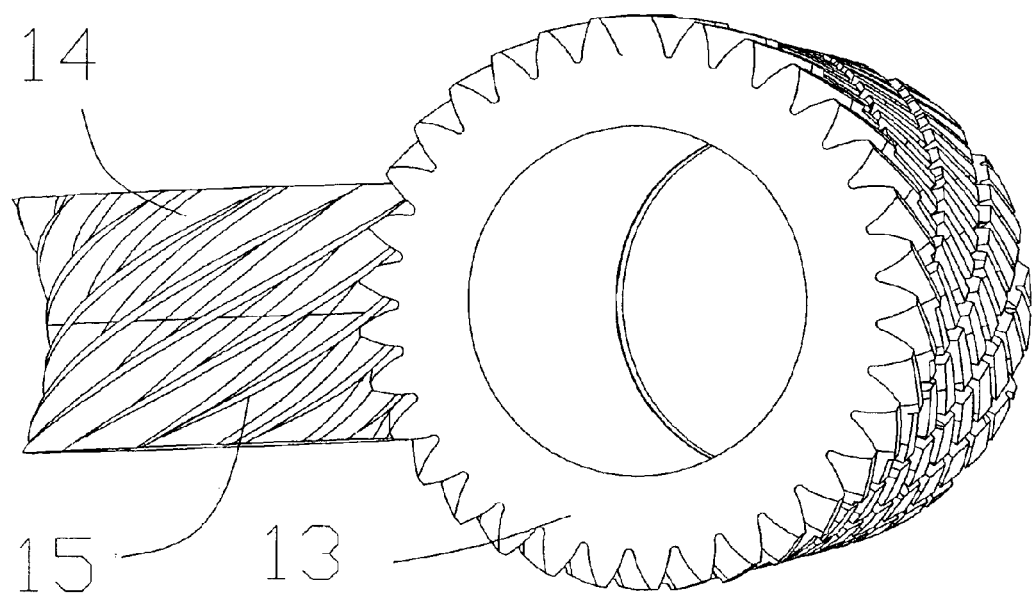
FIG. 10 is another isometric view of a helical hob in mesh with manufacturing enveloping worm having threads with less than one revolution. Enveloping worm has a split line in the middle.
Figure 11:
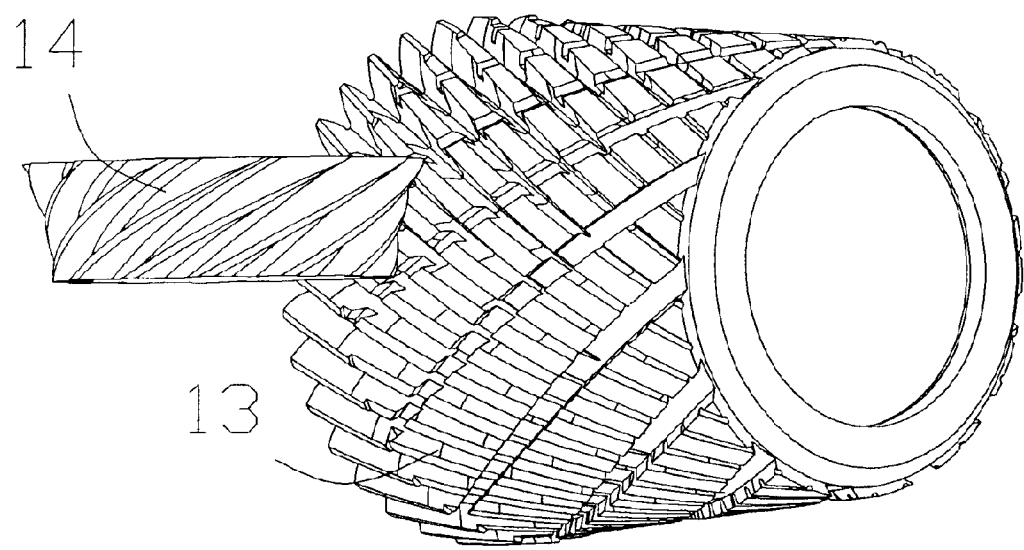
FIG. 11 is isometric view of a helical hob in mesh with manufacturing enveloping worm having threads with less than one revolution.

FIG. 9 is an isometric view of a helical profile cutter 13 in mesh with a blank for machining an enveloping worm having threads with less than one revolution. Enveloping worm is a solid piece that could be split after machining it into halves 14 and 15 of different enveloping worm pinions. Different view of FIG. 9 is shown in FIG. 10. FIG. 11 is an isometric view of a helical profile hob 13 in mesh with enveloping worm blank 14 having threads with less than one revolution.

Figure 12:
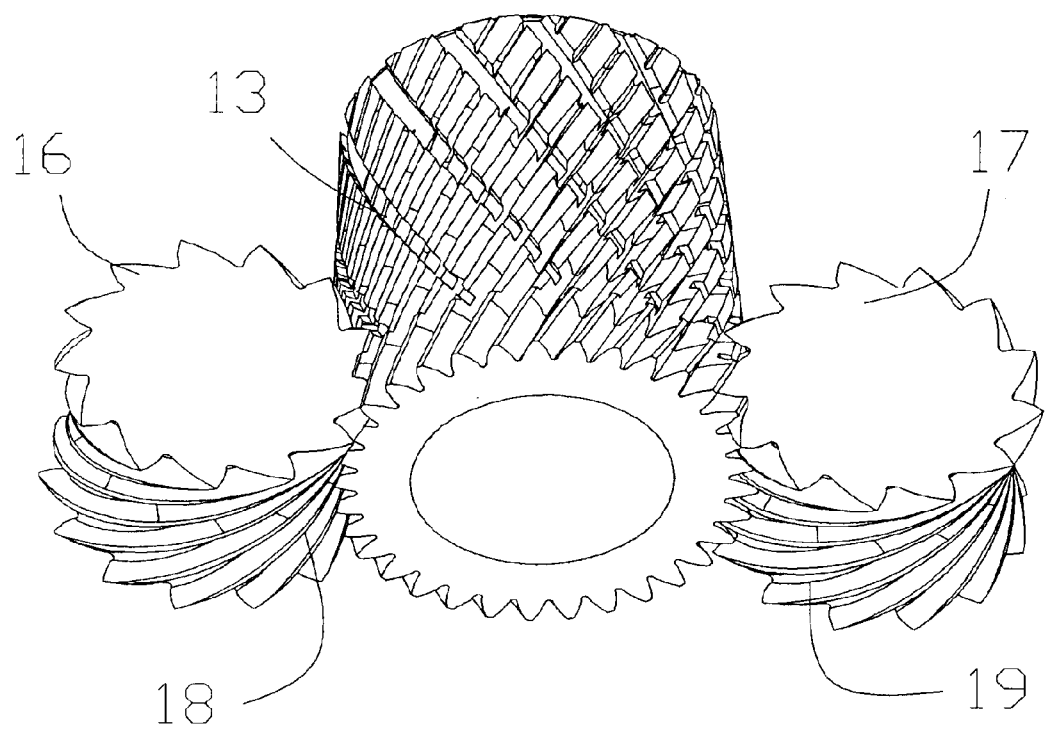
FIG. 12 is an isometric view of a helical hob in mesh with two manufacturing enveloping worms having threads with less than one revolution. The enveloping worms could be split in half after machining.

FIG. 12 is an isometric view of a helical profile cutter 13 in mesh with two enveloping worm blanks with synchronized rotation having threads with less than one revolution. The enveloping worm could be split in halves 16, 17, 18 and 19 after machining.

Figure 13:
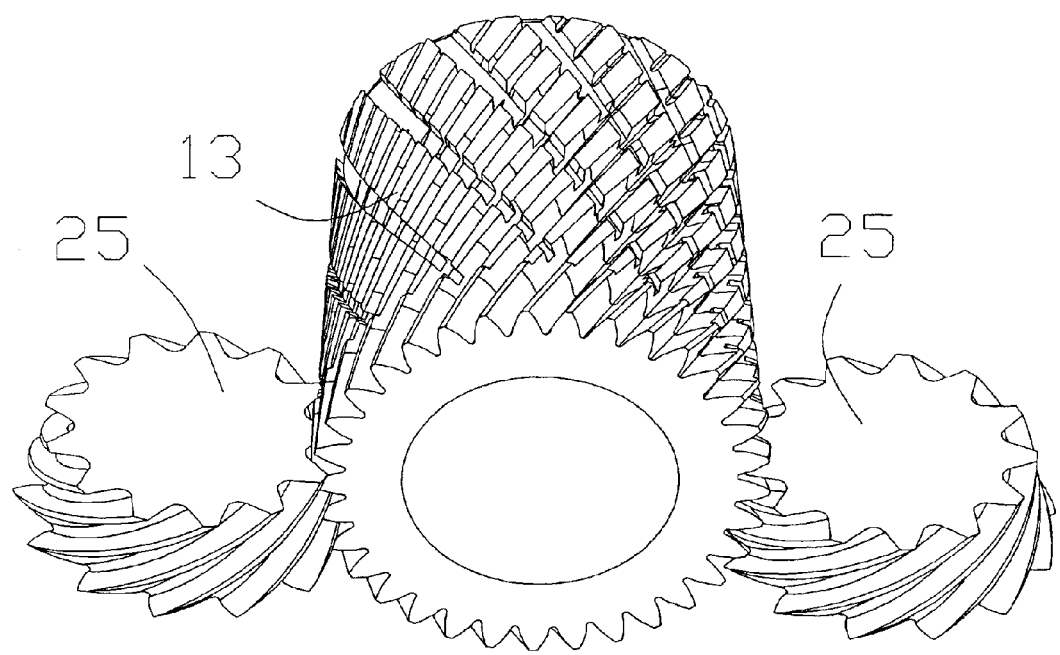
FIG. 13 is an isometric view of a helical hob in mesh with two manufacturing enveloping worms having threads with less than one revolution.

FIG. 13 is an isometric view of a helical profile cutter 13 in mesh with two enveloping worm blanks for machining enveloping worms having threads with less than one revolution.

Figure 14:
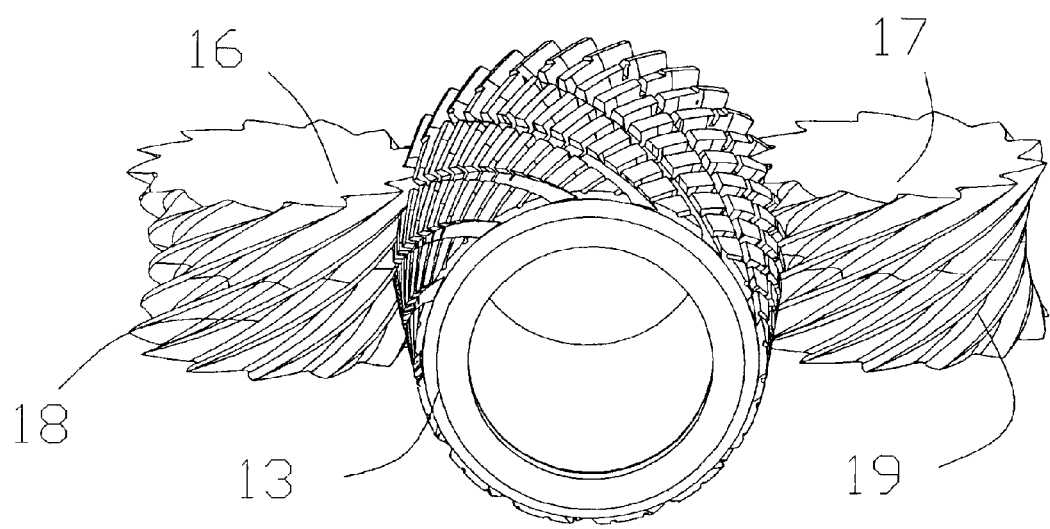
FIG. 14 is another observation of the isometric view from FIG. 12.

FIG. 14 is another observation of the isometric view from FIG. 12.

Figure 15:
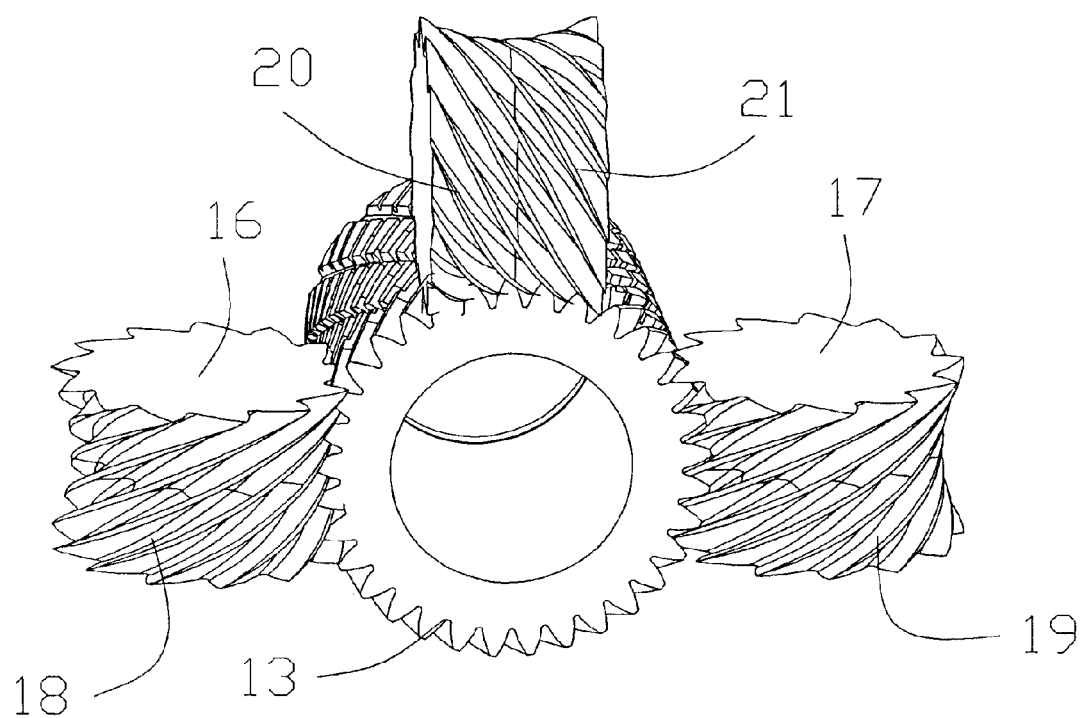
FIG. 15 is an isometric view of a helical hob in mesh with three manufacturing enveloping worms having threads with less than one revolution. The enveloping worms could be split in half after machining.

FIG. 15 is an isometric view of a helical profile cutter 13 in mesh with three enveloping worms with synchronized rotation for machining enveloping worms having threads with less than one revolution. The enveloping worm could be split in halves 16, 17, 18, 19, 20 and 21 after machining.

Figure 16:
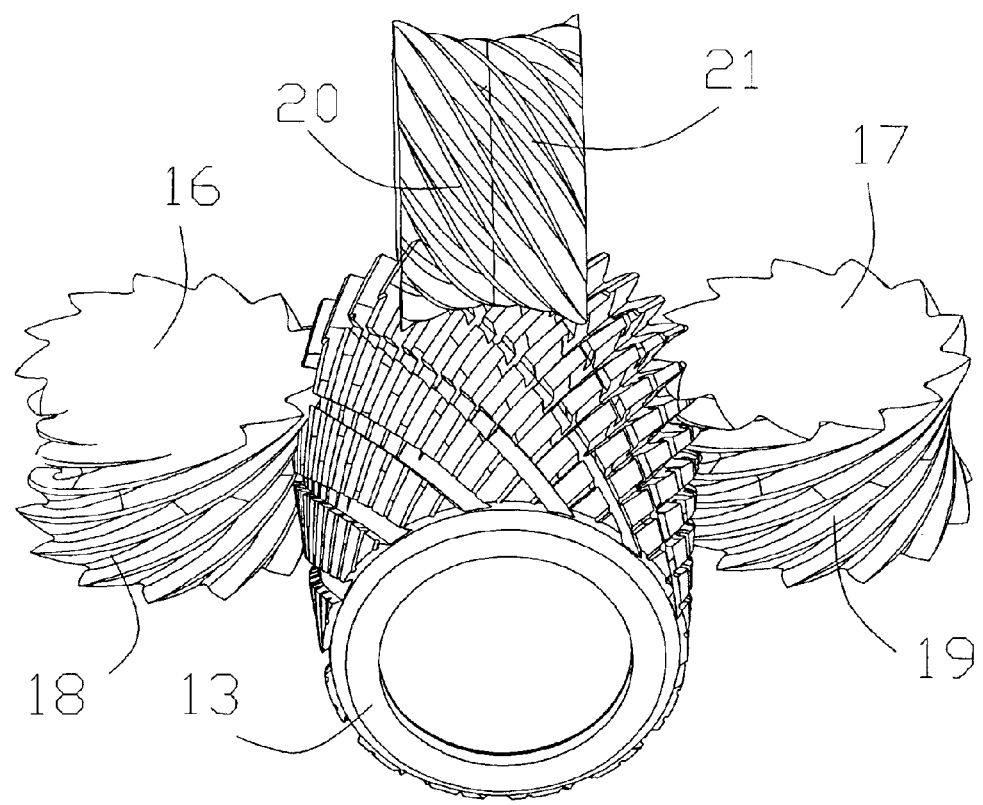
FIG. 16 is another isometric view of a helical hob in mesh with three manufacturing enveloping worms having threads with less than one revolution. The enveloping worms could be split in half after machining.

FIG. 16 is another observation of the isometric view from FIG. 15.

Figure 17:
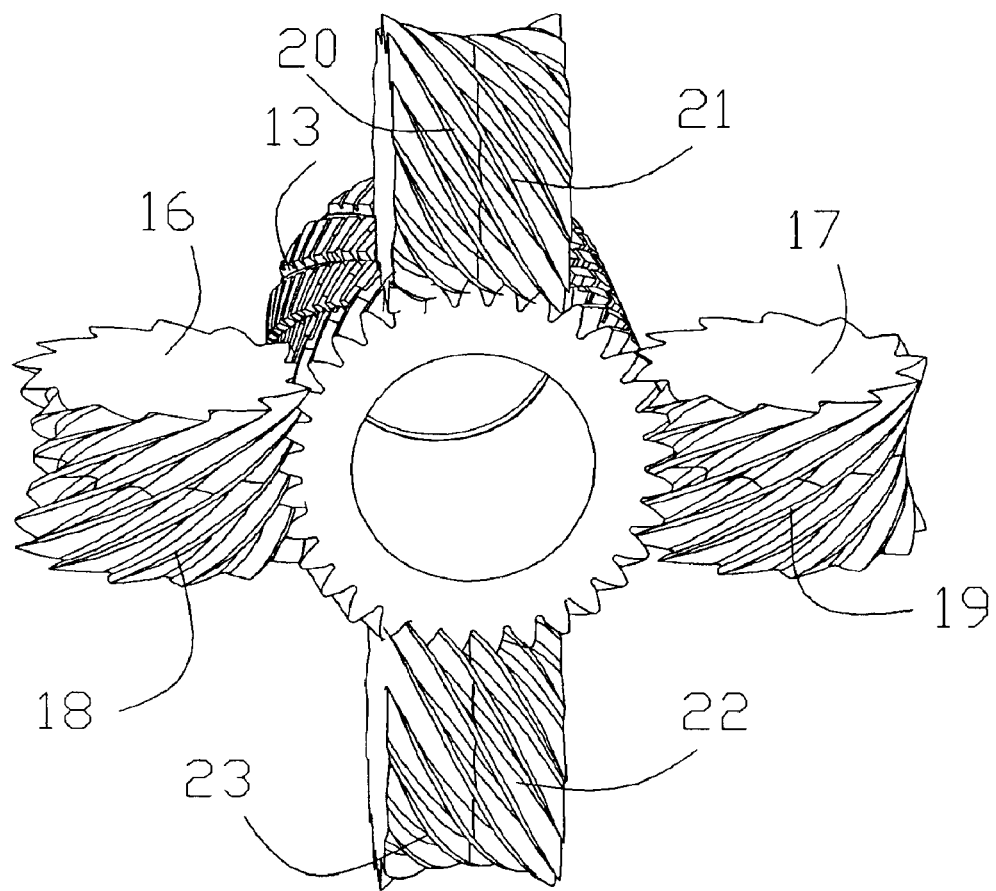
FIG. 17 is an isometric view of a helical hob in mesh with four manufacturing enveloping worms having threads with less than one revolution. The enveloping worms could be split in half after machining.
Figures 18, 19:
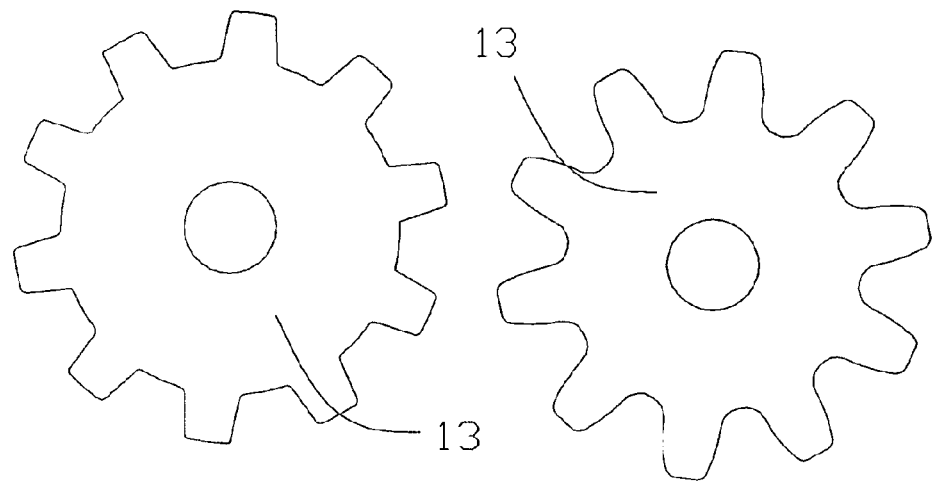
FIG. 18–FIG. 21 are cross sections of a helical cutter with different profile of cutting edges.

FIG. 17 is an isometric view of a helical profile cutter 13 in mesh with four enveloping worm blanks for machining enveloping worms having threads with less than one revolution. The enveloping worm could be split in halves 16, 17, 18, 19, 20, 21, 22 and 23 after machining. FIG. 18 is a cross section of cutter 13 with straight cutting edges.

Figures 20, 21:
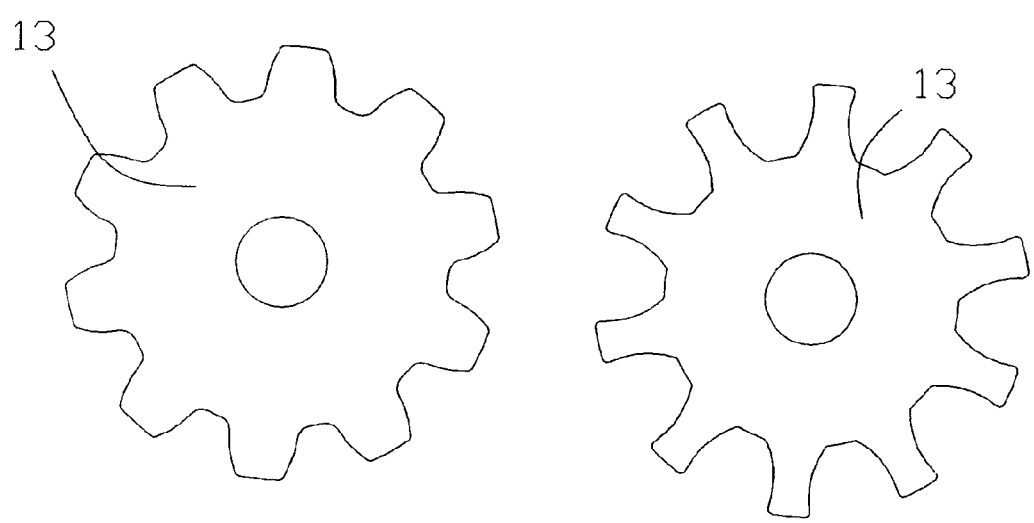

FIG. 19 is a cross section of cutter 13 with involute cutting edges. FIG. 20 is a cross section of cutter 13 with crown convex cutting edges and FIG. 21 is a cross section of cutter 13 with crown concave cutting edges. For specific design, profile of cutting edges can be different, even more complicated. For generating enveloping worm that will be a pinion, it could be a cutter with straight cutting edges. For generating an enveloping worm that will be used us a hob to generate matting gear, profile of cutting edges could be crown profile with concave cutting edge.

For machining of enveloping worm thread surface, axis of rotation of helical cutter 13 is placed in the center of base circle 8 and cutter's 13 cutting edges will be located around a base circle. To produce enveloping worm, enveloping worm blank 6 rotates around axis W of enveloping worm blank 6 and enveloping worm blank 6 has relative motion around tooling axis Z to helical cutter 13. Helical cutter 13 furthermore has linear motion along its axis of rotation, which is linear motion normal to cutting plane X Y. This linear motion is tangential feeding. Helical's cutter 13 and enveloping worm's blank 6 relative motion around tooling axis Z can be done by helical cutter 13 rotating around tooling axis Z with simultaneous rotation of enveloping worm blank 6 around axis Z or by only rotating enveloping blank 6 around axis Z. Speed of relative motion is a function between number of helical cutter 13 teeth and number of generated threads on the enveloping worm blank 6. Linear feeding can be increment motion or step motion. Generation of enveloping worm from one blank can produce up to two enveloping worms with 180 or less degree of thread revolution and generation of enveloping worm from two blanks can produce up to four enveloping worms with 180 or less degree of thread revolution. Generation of enveloping worm from three blanks can produce up to six enveloping worms with 180 or less degree of thread revolution and generation of enveloping worm from four blanks can produce up to eight enveloping worms with 180 or less degree of thread revolution.

Above described method of producing enveloping worm makes right angle gear boxes less expensive in production than any current technology.

In the invention being thus described, it is obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Method of producing an enveloping worm including generation of an enveloping worm thread surface by a cutter rolling around a base circle of the enveloping worm on a cutting plane with simultaneous rotation of an enveloping worm blank around an axis of said enveloping worm, where a cutting edge of said cutter furthermore rotates around a tooling axis.

2. Method of producing an enveloping worm as recited in claim 1 where said tooling axis has additional motion, in a direction normal to said cutting plane.

3. Method of producing an enveloping worm as recited in claim 1 where said tooling axis has additional motion by changing an angle between said tooling axis of rotation and said cutting plane.

4. Method of producing an enveloping worm as recited in claim 1 where a radius of rotation of said cutting edge is equal to or bigger than the maximum radius of convex curvature of said worm thread.

5. Method of producing an enveloping worm as recited in claim 1 where a radius of rotation of said cutting edge is equal to or smaller than the maximum radius of concave curvature of said worm thread.

6. Method of producing an enveloping worm as recited in claim 1 including placement of said cutter in a new position defined by repositioning of said cutting plane from an original position to said new position.

7. Method of producing an enveloping worm as recited in claim 6, where said repositioning of said cutter from said original position into said new position is defined by turning said cutter relative to a base coordinate system and said enveloping worm axis of rotation.

8. Method of producing an enveloping worm as recited in claim 6, where said repositioning of said cutter from said original position into said new position is defined by transferring said cutter relative to a base coordinate system and said enveloping worm axis of rotation.

9. Method of producing an enveloping worm as recited in claim 6, where said repositioning of said cutter from a original position into said new position is defined by combinations of transferring and turning said cutter relative to a base coordinate system and said enveloping worm axis of rotation.

10. Method of producing an enveloping worm as recited in claim 6, wherein placement of said cutter in said new position is for machining a convex face of said enveloping worm thread.

11. Method of producing an enveloping worm as recited in claim 6, wherein placement of said cutter in said new position is for machining a concave surface of said enveloping worm thread.

* * * * *